July 15, 1952 D. J. STEWART 2,603,248
WOOD-SAWING ATTACHMENT FOR AUTOMOBILES
Filed Feb. 9, 1948 4 Sheets-Sheet 1
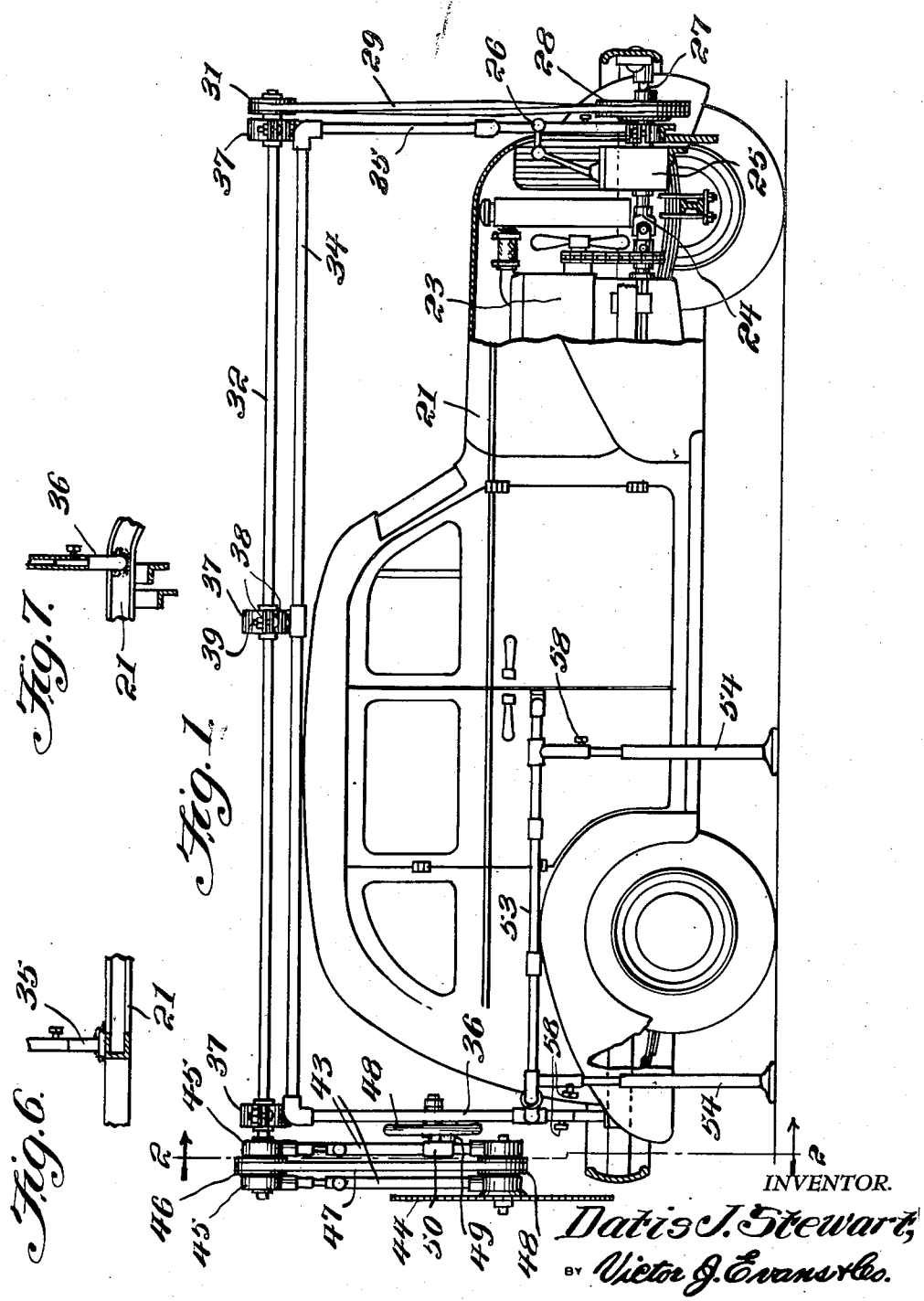
INVENTOR.
Davis J. Stewart,
BY Victor J. Evans & Co.
ATTORNEYS

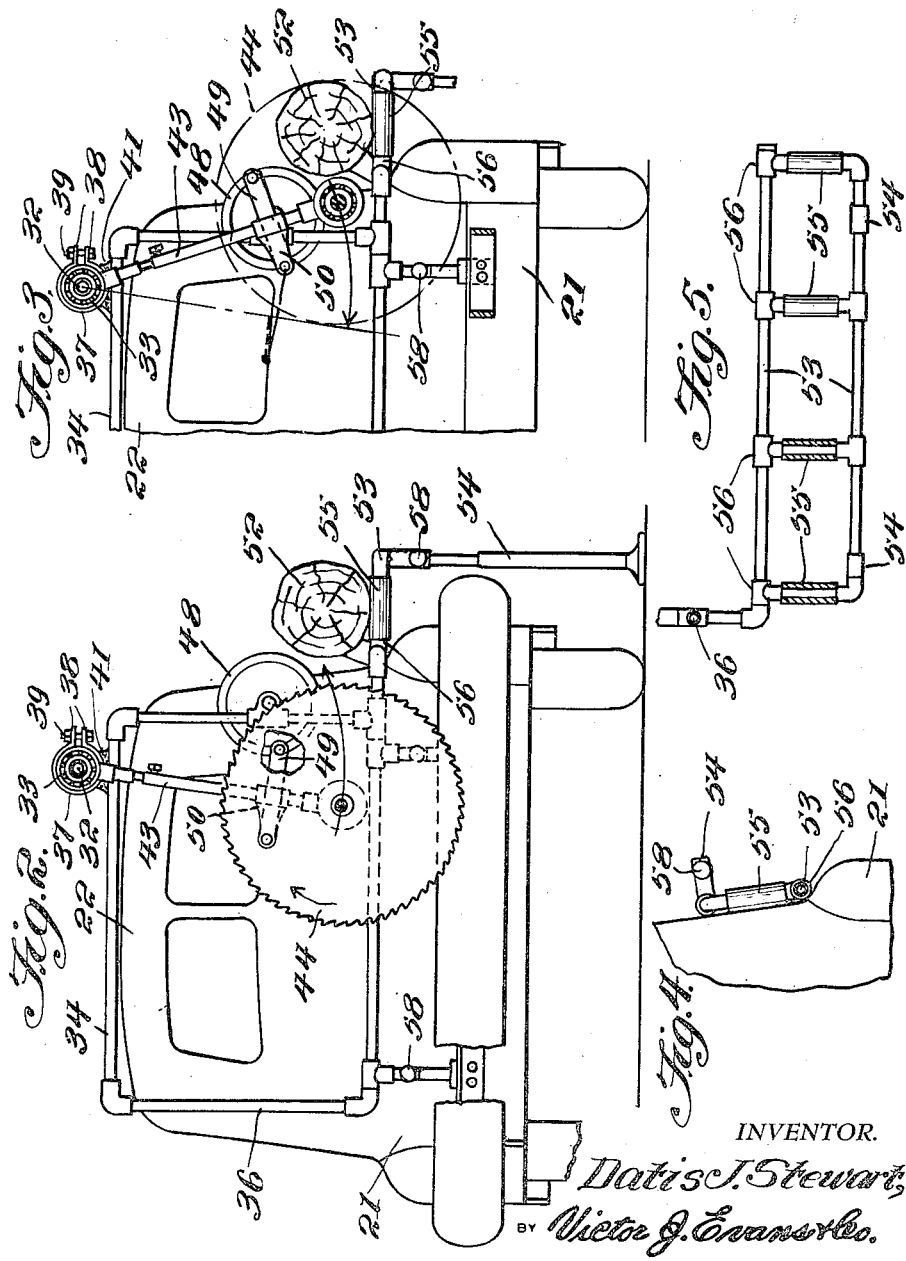

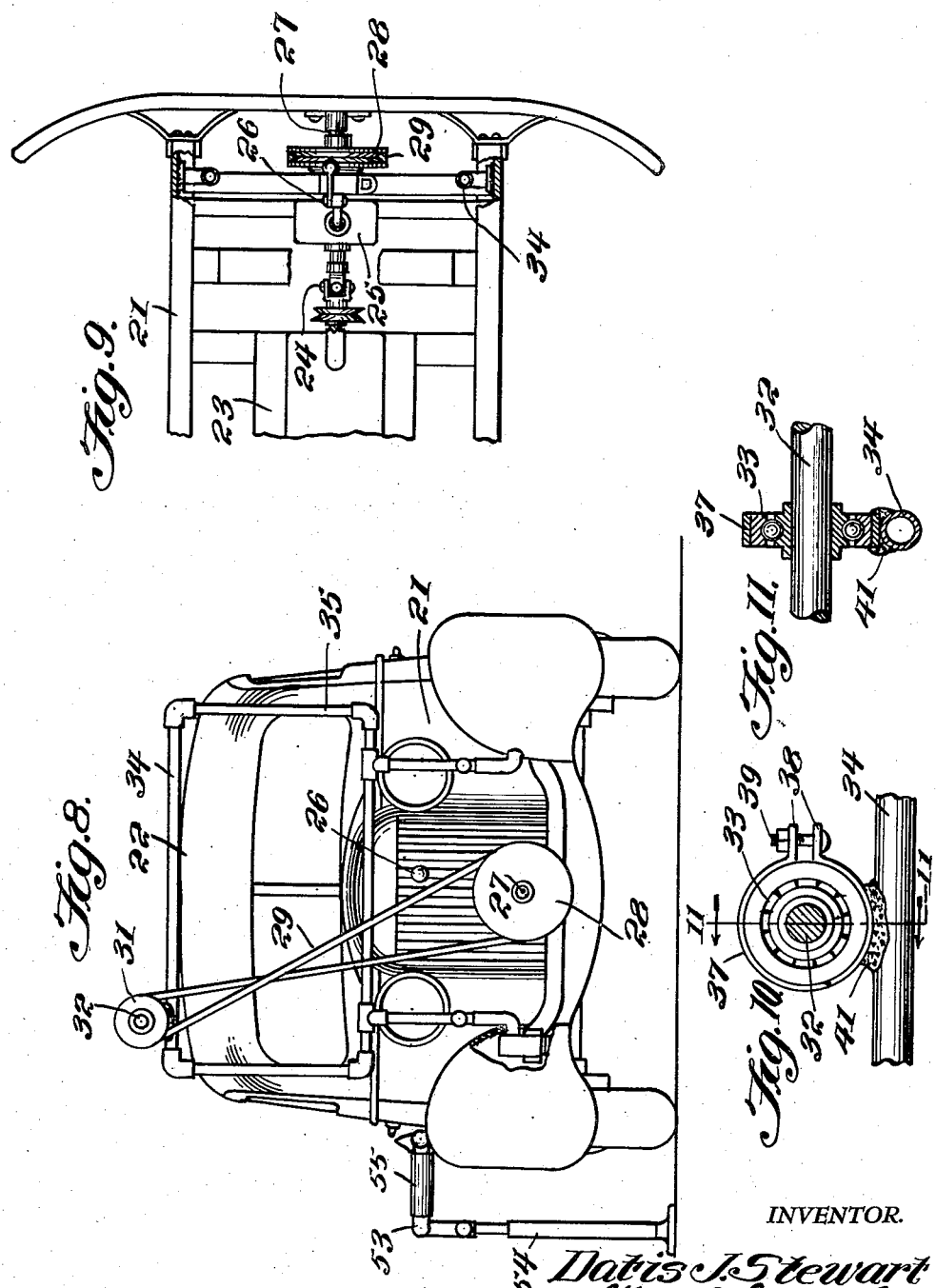

July 15, 1952 D. J. STEWART 2,603,248
WOOD-SAWING ATTACHMENT FOR AUTOMOBILES
Filed Feb. 9, 1948 4 Sheets-Sheet 4
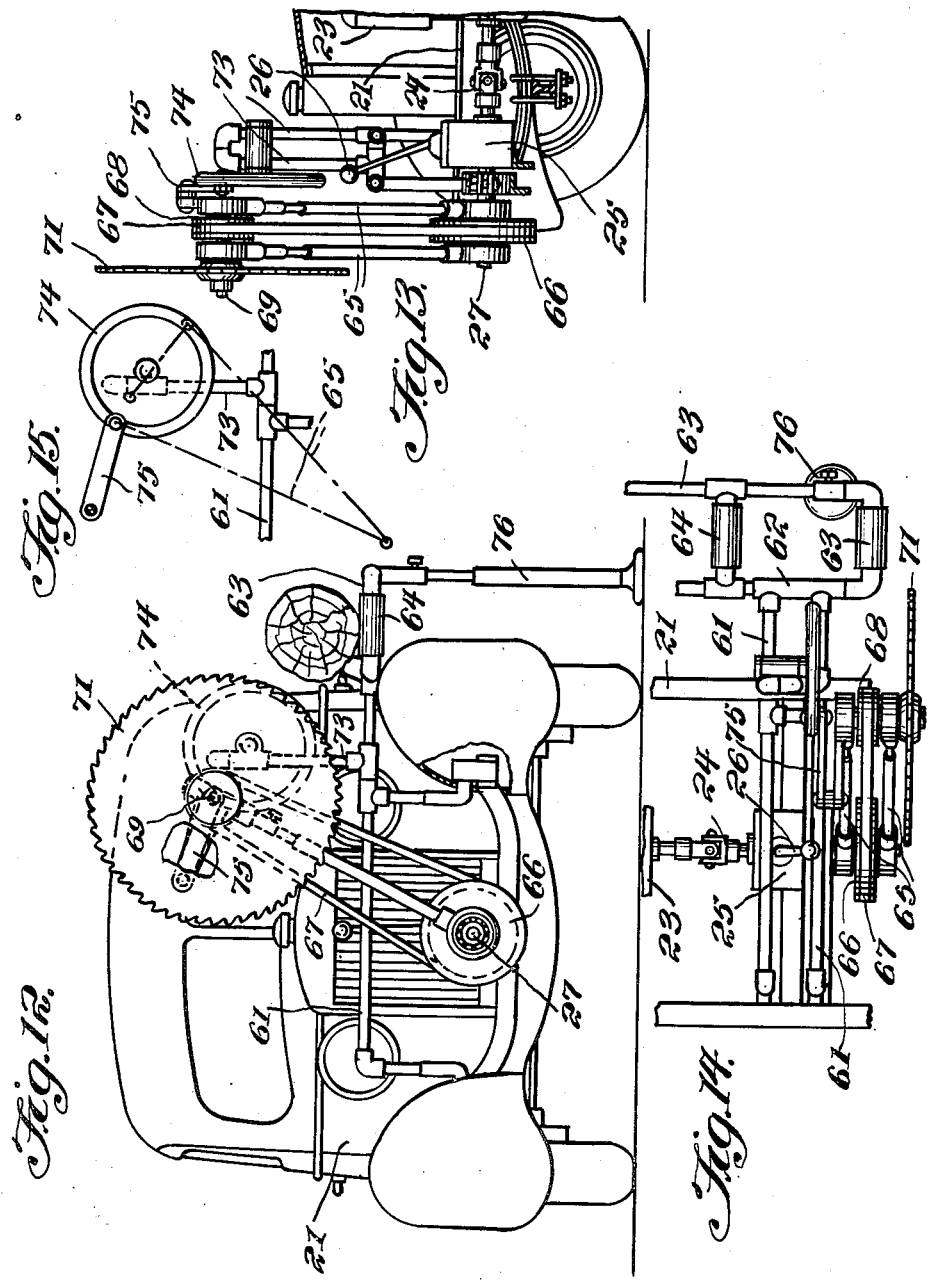
INVENTOR.
*Davis J. Stewart,*
BY *Victor J. Evans & Co.*
ATTORNEYS Patented July 15, 1952

2,603,248

UNITED STATES PATENT OFFICE 2,603,248

WOOD-SAWING ATTACHMENT FOR AUTOMOBILES

Datis John Stewart, Cardston, Alberta, Canada, assignor of one-half to James A. Key, Cardston, Alberta, Canada Application February 9, 1948, Serial No. 7,266

2 Claims. (Cl. 143—43)

This invention relates to a wood sawing attachment for automobiles.

It is an object of the present invention to provide a wood sawing attachment which can be connected to the forward end of an automobile to receive power from the forward end of the crank shaft and to a supporting frame adapted to contain a saw which may be swung laterally to cut the wood and to a table over which the wood can be extended while being moved to a new position to be cut.

It is another object of the present invention to provide an attachment which can be connected to the automobile to saw wood wherein the frame parts can be easily and quickly mounted upon the automobile and which are separable for the purpose of transport.

Other objects of the present invention are to provide a swing saw attachment for automobiles which is of simple construction, inexpensive to manufacture and efficient in operation.

For other objects and for a better understanding of the invention, reference may be had to the following detailed description taken in connection with the accompanying drawing, in which Fig. 1 is a side elevational view of a vehicle with portions broken away to show the attachment of the wood saw thereto and its driving connection with the automobile engine.

Fig. 2 is a rear elevational view of a vehicle and of the attachment shown in Fig. 1.

Fig. 3 is a fragmentary rear elevational view similar to Fig. 2 but where the swing saw has been swung to a location to completely sever the piece of wood being sawed.

Fig. 4 is a fragmentary detail view showing the roller support for the logs folded upwardly along the side of the vehicle for transport.

Fig. 5 is a top plan view of the log support.

Fig. 6 (sheet 1) is a fragmentary detail view showing the connection of one of the pedestals to the frame of the car.

Fig. 7 is a fragmentary detail view showing the connection of one of the pedestals connected to the forward frame of the car.

Fig. 8 (sheet 3) is a front elevational view of the automobile and of the attachment connected therewith and showing the belt connection with a drive extending over the top of the automobile.

Fig. 9 is a fragmentary view of the forward end of the vehicle and showing in plan the driving connection and transmission which is attached to the forward end of the engine.

Fig. 10 is a bearing bracket support for a shaft which extends along the top of the automobile.

Fig. 11 is a cross-sectional view taken on line 11—11 of Fig. 10.

Fig. 12 is a front elevational view of an automobile with a modified form of swing saw attachment connected thereto, the saw being located at the front of the automobile instead of in the previous form.

Fig. 13 is a side elevational view of the modified attachment shown in Fig. 12.

Fig. 14 is a fragmentary and top plan view of the attachment shown in Fig. 12.

Fig. 15 is an elevational view of portions of the saw attachment and illustrating the path or movement of the saw being swung through the log being cut.

Referring now particularly to Figures 1 to 11, 21 represents an automobile having a top 22 and an engine power plant 23 from which power is taken for driving the saw attachment to be presently described. The crank shaft is extended and provided with a universal joint connection 24 which is connected to a transmission box 25 adapted to be controlled by a gear shift lever 26 so as to regulate the output speed of a shaft 27 extending from the gear box 25. At least two different speeds may be had for driving the saw. Likewise the gear shift lever 26 can be adjusted to a neutral position to stop the operation of the saw. On the shaft 27 is a pulley wheel 28 from which there is extended a pulley belt 29 which is connected to a pulley wheel 31 on a long driven shaft 32 extending the full length of the automobile to a rear position. The shaft 32 is journalled in ball bearing elements 33 carried on a super structure or frame 34 which is built up over the top of the automobile and extends throughout the length thereof. Pedestals 35 and 36 connect the frame with the respective forward and rear ends of the automobile.

The ball bearing element is releasably secured to a metal strap 37 having separable ends 38 which are normally retained in closed position by a clamping bolt 39. The strap is welded as indicated at 41 to the frame 34, Figs. 10 and 11. By having the bearing elements 33 releasably attached to the frame, the shaft can be removed easily for replacement or for transport of the sawing attachment. The shaft 32 at its rear end supports a swing saw 43 having a saw or arm blade 44 on its lower end. The swing saw has bearing blocks 45 at its upper end journalled to the end of the shaft 32. Between the bearing blocks 45 is a pulley wheel 46 connected by a belt 47 with pulley wheel 48 of the saw 44.

On the vertical supports or pedestals 36 at the rear of the automobile, there is pivoted a hand wheel 48 which is connected by a link 49 to swing saw supporting members 43. A bracket 50, Fig. 2, is provided on the members 43 for the connection of the link 49 therewith. Accordingly by turning the wheel 48 the swing saw 43 will be drawn through a wood log 52 supported upon a table 53 extended over one of the rear fenders of the automobile and supported upon detachable legs 54 extending to the ground. When the swing saw has been pulled sufficiently across the log 52, a portion thereof will have been severed.

The table 53 has rollers 55 for supporting the log 52 whereby to facilitate its longitudinal movement into the path of the saw 44.

The table 53 includes a portion extending along the side of the automobile and close thereto to provide a hinge connection for T-fittings 56 whereby to permit the outer part of the table and the rollers to be pivoted upwardly as shown in Fig. 4 to an out-of-the-way position and for the purpose of transport.

All of the frame parts and the pedestals are so constructed that they can be separated from one another by releasing clamping screws on various parts whereby to release other parts which have telescoping engagement with the parts having the screws. Such screws are indicated at 58. The table legs are indicated at 54 and can be detached from the table at times when the attachment is being transported from one location to another.

Referring now particularly to Figs. 12 to 14, there is shown a modified form of the invention in which the saw is located at the front end of the automobile. To the front end of the automobile, there is attached a pipe frame 61 which has at one side a sleeve 62 in which is hinged a table 63 with rollers 64 thereon. An extension is provided of the shaft leaving the transmission 25 so that swing saw members 65 can be attached on opposite sides of a pulley 66. A belt 67 extends upwardly and over pulley wheel 68 on shaft 69 mounted on the upper ends of the swing saw members 65. The shaft 69 has a saw 71. The swing saw members 65 can be pivoted on the shaft extension toward table 63 on which the log to be sawed is disposed.

On an upright support 73 there is journalled a hand crank or wheel 74 which is connected by a link 75 with the shaft 69. As the crank wheel 74 is rotated, the swing saw will be brought downwardly across the log and table. The table can be separated from its leg supports 76 and swung upwardly for the purpose of transport.

While various changes may be made in the detail construction, it shall be understood that such changes shall be within the spirit and scope of the present invention as defined by the appended claims.

I claim:

1. A wood saw attachment for automobiles comprising a frame adapted to be attached to the exterior of the automobile and extend upwardly therefrom, a universal driving connection adapted to be connected to the crankshaft of the engine of the automobile, a transmission connected to said driving connection, a pulley driven by said transmission, a shaft, a pulley on each end of said shaft, a belt drive connected between the pulley driven by the transmission and the pulley on one end of said shaft, a swing saw connected to the shaft to swing about the same and toward the side of the automobile, and a table for supporting a log connected to the frame and adapted to retain the log so that it will be traversed by the swing saw as it is pivoted upon the shaft, said frame extending upwardly from the front of the automobile and rearwardly and connected to the rear of the automobile, said shaft extending along the top of the frame above the vehicle, said swing saw being connected to the rear end of the shaft to be suspended therefrom and to swing outwardly to cut a log, and said log supporting table extending laterally over the rear wheel of the automobile and said shaft being releasably secured to the top of the frame, means for supporting the shaft including ball bearing elements, a separable strap for retaining the ball bearing elements and said strap being secured to the frame, said strap being retained about the ball bearing elements by a clamping bolt.

2. In combination, a vehicle including a top, a power plant, a transmission box arranged adjacent said power plant and operatively connected thereto, a drive shaft extending forwardly from said transmission box, a manually operable lever for controlling the speed of said drive shaft, a pulley wheel mounted on said drive shaft, a frame extending longitudinally across the top of said vehicle, pedestals connecting said frame to the front and rear of the vehicle, a driven shaft supported by said frame and detachably connected thereto, a pulley wheel mounted on said driven shaft, a belt trained over said pulley wheels, a swing saw arm connected to the rear end of said driven shaft, a saw blade carried by the lower end of said arm, belt and pulley means connecting said saw blade to said driven shaft, a hand wheel pivotally connected to the rear of said vehicle, a link pivotally connecting said hand wheel to said arm whereby movement of said hand wheel will cause said link to move said saw into a log to be cut, a log supporting table arranged along one side of said vehicle and hingedly connected to the frame in the path of the swing saw, a plurality of rollers arranged along said table, and legs detachably connected to said table.

DATIS JOHN STEWART.

REFERENCES CITED

The following references are of record in the file of this patent:

UNITED STATES PATENTS

| Number | Name | Date |
|---|---|---|
| 558,772 | Browne | Apr. 21, 1896 |
| 1,189,008 | Shellberg | June 27, 1916 |
| 1,350,668 | Oversmith | Aug. 24, 1920 |
| 1,399,738 | Bonelli | Dec. 13, 1921 |
| 1,417,686 | Powell | May 30, 1922 |
| 1,547,239 | Sheridan | July 28, 1925 |
| 1,547,360 | Byrd | July 28, 1925 |
| 1,593,079 | Jaeger | July 20, 1926 |
| 1,602,097 | Beverly | Oct. 5, 1926 |
| 1,744,201 | Balke | Jan. 21, 1930 |
| 1,837,141 | Westhoff | Dec. 15, 1931 |
| 1,868,770 | See | July 26, 1932 |
| 2,330,996 | Rivers | Oct. 5, 1943 |

FOREIGN PATENTS

| Number | Country | Date |
|---|---|---|
| 454,208 | France | Apr. 23, 1913 |